UNITED STATES PATENT OFFICE

2,449,191

PHENACETYLAMINOMETHYLCROTONIC ACID

Otto K. Behrens, Indianapolis, Ind., assignor to Eli Lilly and Company, Indianapolis, Ind., a corporation of Indiana No Drawing. Application August 24, 1945, Serial No. 612,523

1 Claim. (Cl. 260—518)

This invention relates to a new organic compound and is directed to a new N-phenylacetylated α-amino acid.

By this invention there is provided a new compound, N - phenylacetyl-α-amino-β,β-dimethylacrylic acid, which may be represented by the following formula

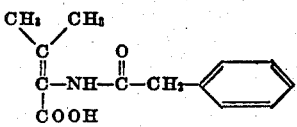

and certain intermediates in the preparation thereof.

N-phenylacetyl-α - amino-β,β - dimethylacrylic acid is a white crystalline compound melting at about 176–177° C. It is a derivative of α-amino-β,β-dimethylacrylic acid, an unstable acid incapable of existing in a form where in the α-amino group is unsubstituted. Substitution of the α-amino group by a phenylacetyl group converts the unstable acid to a stable derivative thereof, the N-phenylacetyl-α-amino-β,β-dimethyracrylic acid of this invention.

The compound of this invention may be employed in the form of its free acid and also in the form of its salts such as the sodium, potassium, calcium, magnesium, ammonium, and substituted ammonium salts, as well as in the form of its lower alkyl esters such as the methyl, ethyl, and propyl esters. Such salts and esters are to be regarded as within the scope of this invention.

According to a method aspect of the invention, N - phenyl-acetyl-α-amino - β,β - dimethylacrylic acid may be prepared by a series of reactions starting with β-hydroxyvaline. These reactions may be represented by the following equations:

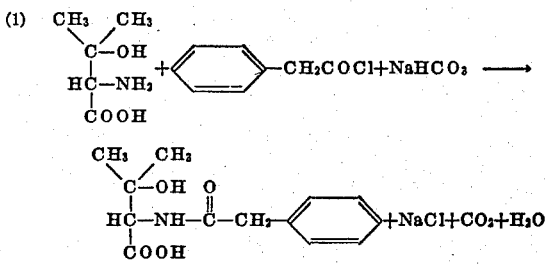

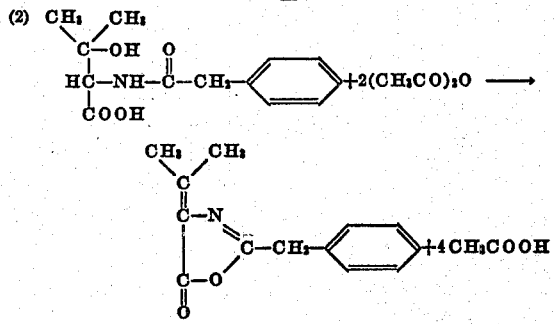

Equation 1 shown above represents the conversion of β-hydroxyvaline to N-phenylacetyl-β-hydroxyvaline by reaction with phenylacetyl chloride and sodium bicarbonate. By this reaction the α-amino group of the β-hydroxyvaline molecule is substituted by a phenylacetyl group.

Equation 2 shown above represents the conversion of N-phenylacetyl-β-hydroxyvaline to N-phenylacetyl - α-amino-β,β - dimethylacrylic acid azlactone by reaction with acetic anhydride. By this reaction the β-hydroxy group of the valine portion of the molecule is removed, and the carboxy group combines with the keto group of the phenylacetyl portion of the molecule to form the 5-membered, heterocyclic azlactone ring.

Equation 3 shown above represents the conversion of N-phenylacetyl-α-amino-β,β-dimethylacrylic acid azlactone to N- -phenylacetyl - α - amino-β,β-dimethylacrylic acid by hydrolysis with water whereby the heterocyclic ring of the azlactone is cleaved.

As described and claimed in copending application Serial No. 612,525, which is now U. S. Patent 2,440,355, filed on even date herewith, the compound of this invention has been found to exhibit novel and unexpected utility in the preparation of penicillin. By way of contrast, this utility is not possessed by phenylacetylated amino acids in general. It is known of course that penicillin may be produced, presumably as a metabolic product, when a Penicillium mold is grown in the presence of a nutrient medium, and the penicillin so produced subsequently may be isolated from the mold and nutrient medium.

As described in said copending application, an accelerated rate of production and an increased yield of penicillin may be obtained by incorporating a relatively small amount of the compound of the present invention in the culture medium of a nutrient material in which the Penicillium mold is grown.

Illustratively, by carrying out the process of copending application Serial No. 612,525, by employing, for example, N-phenylacetyl-α-amino-β,β-dimethylacrylic acid in a submerged culture process the concentration of penicillin produced in certain tests under comparative conditions has been substantially increased.

The following example further illustrates this invention.

N-phenylacetyl-α-amino-β,β-dimethylacrylic acid may be prepared as follows:

2.7 g. of β-hydroxyvaline in a solution of 5 g. of sodium bicarbonate dissolved in 100 cc. of water, are treated with small portions of phenylacetyl chloride until a total of 1.5 g. have been added. During the addition, the mixture is constantly agitated and kept below 25° C. The reaction mixture is then acidified with hydrochloric acid and allowed to stand at about 0° C., whereupon N-phenylacetyl-β-hydroxyvaline precipitates. This valine compound is recrystallized from dilute alcohol and melts at about 119–120° C.

N-phenylacetyl-α-amino-β,β-dimethylacrylic acid is prepared from the N-phenylacetyl-β-hydroxyvaline by heating 1.5 g. of the valine compound with 5 cc. of acetic anhydride at about 70° C. for one hour. The excess acetic anhydride and the acetic acid formed during the reaction are then removed by heating in vacuo at 70° C.

To the residue consisting of N-phenylacetyl-α-amino-β,β-dimethylacrylic acid azlactone are added 5 cc. of water and 6 cc. of acetone, and the mixture refluxed for one hour. The acetone is distilled from the mixture and the solution cooled to about 0° C., whereupon N-phenylacetyl-α-amino-β,β-dimethylacrylic acid crystallizes. It is partially purified by washing with chloroform-petroleum ether mixture and further purified by precipitation from 15 cc. of hot acetone by the addition of 20 cc. of water. The N-phenylacetyl-α-amino-β,β-dimethylacrylic acid thus obtained melts at about 176–177° C. A micro-Dumas analysis has shown the presence of 5.99 percent of nitrogen as compared with a calculated value of 6.01 percent.

Having thus described my invention, what I claim as new and desire to secure by Letters Patent of the United States is:

N-phenylacetyl-α-amino-β,β-dimethylacrylic acid represented by the formula

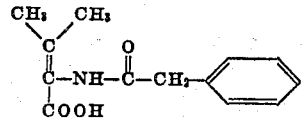

OTTO K. BEHRENS.

REFERENCES CITED

The following references are of record in the file of this patent:

UNITED STATES PATENTS

| Number | Name | Date |
|---|---|---|
| 743,986 | Nicolaier et al. | Nov. 10, 1903 |
| 1,877,906 | Laska et al. | Sept. 20, 1932 |
| 2,179,979 | Isler | Nov. 14, 1939 |

OTHER REFERENCES

Abderhalden et al., Zeit Physiol Chemistry, vol. 163, p. 262 (1927).

Carter et al., Journal Biol. Chemistry, vol. 129, pp. 361–362 (1934).

Ramage et al., Journal Chemical Society (London) 1935, pp. 534 and 535.

Bolvinnik et al., Chemical Abstracts, vol. 35 (1941), p. 4349.